United States Patent [19]

Spangrud et al.

[11] Patent Number: 5,045,195

[45] Date of Patent: Sep. 3, 1991

[54] PERSONAL DRINKING WATER PURIFICATION TUBE

[75] Inventors: Bruce D. Spangrud, Beaverton, Oreg.; Martin S. Rifkin, Vancouver, Wash.

[73] Assignee: Accuventure, Inc., Portland, Oreg.

[21] Appl. No.: 465,940

[22] Filed: Jan. 16, 1990

[51] Int. Cl.⁵ .......................................... B01D 24/16
[52] U.S. Cl. ................................. 210/266; 210/282; 210/289; 210/291; 210/501; 210/502.1
[58] Field of Search ............... 210/282, 266, 289, 291, 210/501, 502.1

[56] References Cited

U.S. PATENT DOCUMENTS

| | | | |
|---|---|---|---|
| Re. 32,089 | 3/1986 | Blatt et al. | 210/651 |
| 2,761,833 | 9/1956 | Ward | 210/282 |
| 2,781,312 | 2/1957 | Klumb et al. | 210/282 |
| 2,859,724 | 1/1959 | McDevitt | 210/282 |
| 3,038,610 | 6/1962 | Hetherington | 210/282 |
| 3,327,859 | 6/1967 | Pall | 210/282 |
| 4,298,475 | 11/1981 | Gartner | 210/266 |
| 4,420,590 | 12/1983 | Gartner | 525/357 |
| 4,800,018 | 1/1989 | Moser | 210/282 |

FOREIGN PATENT DOCUMENTS 2726529  12/1978  Fed. Rep. of Germany ...... 210/282

Primary Examiner—Stanley Silverman
Assistant Examiner—Cynthia L. Nessler
Attorney, Agent, or Firm—Chernoff, Vilhauer, McClung & Stenzel

[57] ABSTRACT

A portable personal water filtration and purification device which includes an elongate tubular filter housing with layers of mechanical filtration and contains a layer of granular activated charcoal impregnated with silver located between the layers of mechanical filter medium. A mouthpiece limits the rate of flow of water through the filter unit, while making it convenient to draw water through the filter. In one embodiment, a filter unit is attached to a flexible drinking tube and the filter unit is located within a portable water container conveniently carried by a person.

15 Claims, 1 Drawing Sheet

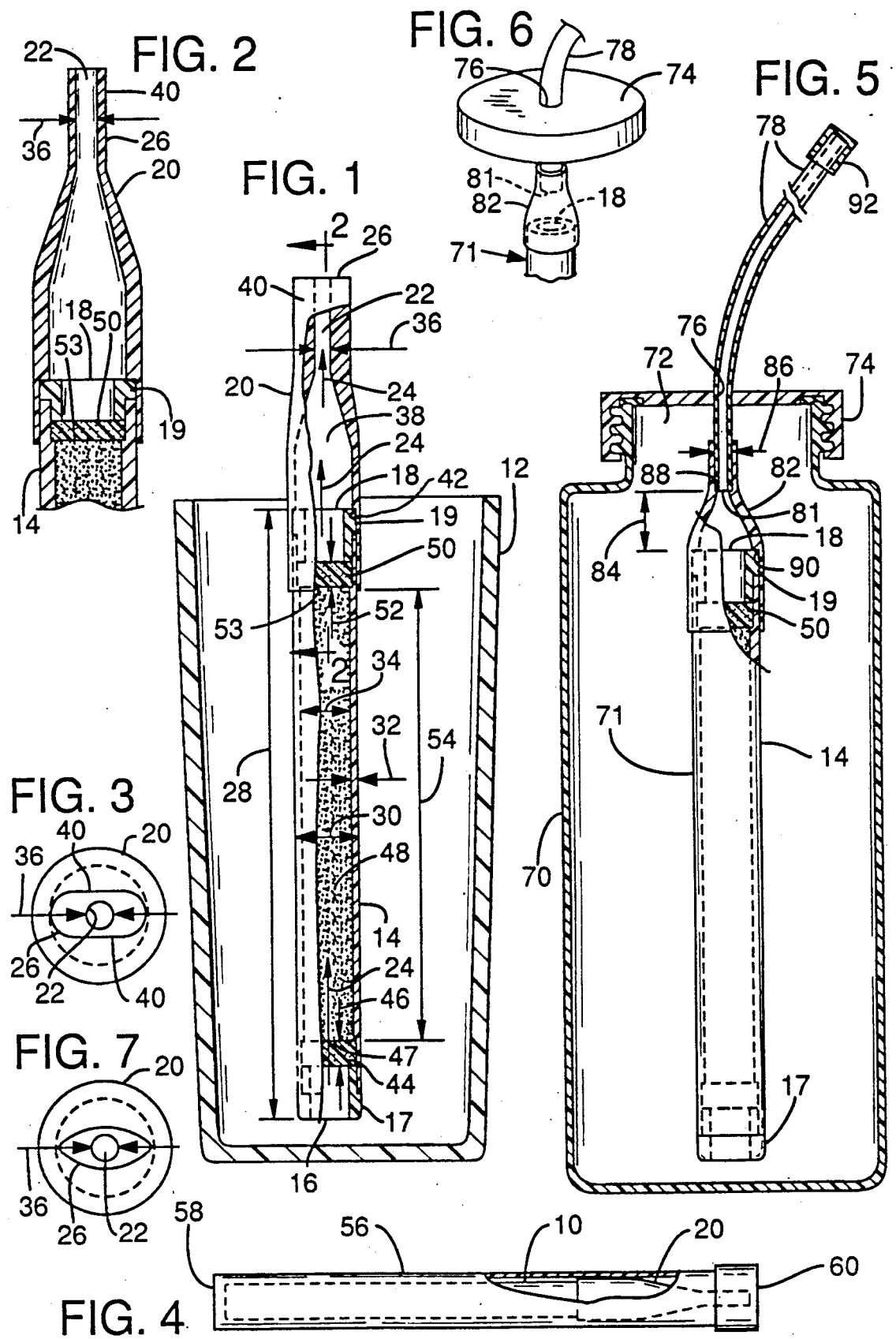

PERSONAL DRINKING WATER PURIFICATION TUBE

BACKGROUND OF THE INVENTION

The present invention relates to purification of drinking water, and particularly to a device for purifying drinking water immediately prior to consumption by an individual.

With the increase of population of the world, together with increasing development of new chemical compounds and disposal of industrial waste over many years, increasing amounts of contamination are found in even the cleanest sources of available surface water and in well water. Adequate purification is not provided for publicly available drinking water in many areas of the world, and travelers not accustomed to the particular water supply in an area being visited often are made ill by contamination present in the water, although local residents are not noticeably affected. Additionally, dissolved gases and minerals present in the water may cause unpleasant taste or odor in the water, even though the water is safe for drinking. Furthermore, medical science is learning that many compounds often found in drinking water supplies may, over long periods of time, be carcinogenic.

As a response, water filtration devices have become available for incorporation in individual household water supply systems to purify drinking water. However, when water from other sources must be consumed, as in restaurants or when a person is traveling and filtered water supply sources are not readily available, it has previously not been convenient to obtain adequately purified drinking water, nor to purify the water which is available.

Gartner U.S. Pat. No. 4,298,475 discloses a portable water purifier including a filter including mechanical filtration elements, bactericidal agents, and an adsorbent material contained within the tubular filter housing so that a user may supply suction from the mouth to draw water through the tube to filter out foreign material and purify the water prior to use. Gartner makes no provision, however, for retention of water within the filter medium for any particular length of time as may be necessary for adsorption of contaminating materials from a quantity of water, with the resultant likelihood of inefficient purification of water by the device disclosed in that prior patent.

Gartner U.S. Pat. No. 4,420,590 discloses certain resins useful as filter media for treatment of drinking water.

Athletes, in particular, often require relatively large quantities of water for consumption during athletic exercise, as, for instance, during long foot races, bicycle races, soccer games, and hiking. Recently, plastic squeeze bottles with drinking tubes extending through removable caps have become popular, particularly for use by athletes, who carry the bottles full of water o other electrolyte-replacement liquids for consumption during the course of athletic events. Such bottles are convenient, for example, for bicyclers, who can carry them clipped to the frame of the bicycle, or for track and swimming competitors, who have their preferred liquids available in such bottles to be drunk between heats. However, such bottles contain a limited amount of water brought from an available source of water of satisfactory purity, and once consumed, such water must be replaced by whatever water is available, which may not always be acceptably pure.

What is needed, therefore, is a way to purify locally available water to provide drinking water which is acceptably pure and free from objectionable odors and tastes, as well as being acceptably free of microbial organisms which might cause illness. Preferably such a water purification device should be easily portable, and should be convenient for use in places such as restaurants, so that travelers will not jeopardize their health by being embarrassed to use such a device in a restaurant.

SUMMARY OF THE INVENTION

The present invention provides an unobtrusive portable personal water filter device which resembles an oversized drinking straw in its appearance and which is able to filter and purify drinking water adequately to protect the user from illness caused by foreign material suspended or dissolved in an unfamiliar supply of water. A tubular filter housing contains mechanical filtration elements at each end, and an activated charcoal filter in an intermediate location adsorbs many chemical contaminants which might cause objectionable odor or taste or be injurious if consumed. The mechanical filter layers at each end of the filter have pores small enough to retain water within the interior of the filter, and thus the filter assures adequate contact time between the water being filtered and the activated charcoal filter medium. The filter can be cleared of water upon completion of use, by blowing air in a reverse direction through the filter unit.

For use by hikers and athletes, a bottle for carrying a personal supply of drinking water is equipped with a similar filter unit, so that water consumed from a supply carried in the bottle is filtered as it is removed from the bottle through a flexible drinking tube.

A mouthpiece used with the portable personal filter unit and the flexible drinking tube connected to the filter unit contained within the portable water bottle both restrict the flow of water through the filter unit to a rate which provides ample time of contact between the water and the activated charcoal filter medium, in order to provide for efficient adsorption of materials from the water being purified.

It is therefore a principal object of the present invention to provide a device for purifying a personal supply of drinking water immediately prior to consumption.

It is a further object of the present invention to provide a device which enables a user safely to drink available water, such as that found in streams along a hiking route.

It is an important feature of the present invention that it provides a filter unit which is as small as is practical, consistent with effective filtration, reasonable cost, pressure drop no greater than can be produced easily by oral suction, and a reasonably good rate of flow for drinking.

It is another feature of the present invention that it provides a filter unit which is equipped with a mouthpiece limiting the rate of flow of water through the filter unit to provide for ample time of contact between the water being purified and the adsorbent filter medium contained within the filter unit.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partially cut-away view of a personal portable drinking water filter according to the present invention in use in filtering water from a drinking glass.

FIG. 2 is a fragmentary view of the portable personal water filter shown in FIG. 1, taken in the direction indicated by the line 2—2.

FIG. 3 is an end view of the mouthpiece of the portable personal water filter shown in FIGS. 1 and 2.

FIG. 4 is a pictorial view showing the portable personal water filter shown in FIGS. 1-3 in an associated carrying case.

FIG. 5 is a sectional view of a personal drinking water container including a filter according to the present invention.

FIG. 6 is a view of a detail of the personal drinking water container and filter combination shown in FIG. 5.

FIG. 7 is a view similar to FIG. 3, showing another embodiment of the mouthpiece of the filter shown in FIGS. 1 and 2.

DETAILED DESCRIPTION OF THE INVENTION

Referring first to FIGS. 1-3, a portable personal water filter 10 is shown as if being used to drink water from a water glass 12. The personal water filter 10 includes a filter unit 13 including a housing 14 which is generally tubular and elongate, having a lower or inlet end 16, with a retainer fitting 17 and an upper or outlet end 18 with a similar retainer fitting 19. A mouthpiece 20 is attached to the outlet end 18 and defines a conduit 22 through which water can pass in the direction indicated by the arrows 24 in response to a person sucking on the upper end 26 of the mouthpiece 20 as if the personal water filter 10 were a drinking straw.

Preferably, the filter housing 14 is of polystyrene, PVC, or ABS plastic and has an overall length 28 of about 6 inches and an outside diameter 30 of about 0.55 inches, with a wall thickness 32 of about 0.035 inches, leaving an inside diameter 34 of about 0.480 inches.

The conduit 22, in a preferred embodiment of the invention, has an internal diameter 36 of about 0.125 inch over at least a portion of its length. This size limits the rate of flow of water through the personal portable water filter 10, so that water passes through the filter medium slowly enough to provide ample time for contaminants to be adsorbed by the filter medium. The interior of the mouthpiece 20 is tapered between the conduit 22 and the outlet end 18 to define a cavity 38 above the outlet end 18 of the filter housing. The middle portion of the mouthpiece 20 is conically tapered, and the upper end 26 has a pair of parallel upper and lower faces 40 so that in end view, as shown in FIG. 3, the upper end 26 has a lozenge shape, to make it comfortable to receive the upper end 26 of the mouthpiece 20 between a person's lips sealingly, and also to provide for the possibility of holding the upper end portion 26 of the mouthpiece 20 between a person's front teeth. This shape is beneficial when using the filter 10 in cold weather, since when one's face is cold it becomes difficult or impossible to seal the lips tightly around a small circular mouthpiece such as an ordinary drinking straw, yet the upper end portion 26 can be held sealingly by a user's lips, even when cold, because of the wider, lozenge shape. A lenticular shape of the upper end 26 (see FIG. 7) might be easier to use, but would be more difficult to produce.

The lower end of the mouthpiece 20 defines an interior annular ledge 42 which abuts against the upper or inlet end 18 of the filter housing 14, with the inside diameter of the portion of the mouthpiece below the ledge 42 being large enough to fit with a snug push fit over the outlet end 18 portion of the filter housing 14.

Preferably, the filter housing 14 and the mouthpiece 20 are manufactured of appropriate plastics materials with sufficient elasticity so that the mouthpiece 20 grips the outlet end 18 of the filter housing 14 to connect the mouthpiece 20 to the filter housing 14 without the need for an adhesive.

Within the filter housing 14, a multi-layer filtering medium includes at least three functional layers, of which a lower, or inlet end layer 44, preferably having a thickness 46 of about 0.125 inch, serves a dual purpose of filtering particulate matter from water drawn through the filter and of retaining the material of the middle layer 48 within the filter housing 14. The upper, or outlet end layer 50 may be of similar material, of a preferred thickness 52 also of 0.125 inch, leaving the middle layer 48 with a thickness 54, extending longitudinally of the filter housing 14, of at least about 5.5 inches. This size has been determined, on the basis of calculations and empirical testing, to be the minimum size required to accomplish satisfactorily effective filtration practically, that is, to provide clean, substantially tasteless drinking water.

The retainer fittings 17 and 19 are connected to the tubular body of the housing 14 either by an adhesive or by being welded thermally or ultrasonically to the tubular body of the housing 14, and extend radially inward a small distance, great enough to retain the respective layer 44 or 50 within the filter housing 14.

The material of the middle layer 48 is preferably a granulated silver impregnated activated charcoal. Preferably, charcoal made of coconut shell is prepared and ground to pass a 12×30 mesh. The charcoal is impregnated according to EPA-approved industry standard methods to contain 0.026% silver, by weight, and is placed within the filter housing 14 to provide free space equal to about 5% of the volume defined between the filter medium materials of the inlet end or lower layer 44 and the outlet end or upper layer 50, to allow for expansion of the charcoal granules upon being wetted by the water being filtered without choking the filter.

The above-described volume accommodates at least about 0.2 ounce, and preferably 0.2105 ounces, or slightly more, of such granular activated charcoal. This amount of such charcoal provides exposed surface area adequate for satisfactory adsorption of removable impurities at the flow rate through the filter developed by the vacuum generated by a normal person sucking on a drinking straw, that is, a vacuum of about 5 inches of mercury. The diameter 34 provides a great enough cross-sectional area of the end layers 44 and 50 that the pressure drop across those layers does not reduce the flow of water through the filter 13 too greatly for reasonable ease of use of the filter 10. This amount of the activated charcoal filter medium has been shown to be sufficient to adsorb a very high percentage of most materials likely to be encountered which would cause objectionable taste or odor in the water, as well as many other potentially harmful contaminants.

The length or thickness 54 of the middle layer 48 of granular activated charcoal is sufficient to assure ample contact time for adsorption of impurities from water being filtered during its flow through the multi-layer filter unit 13. Use of a significantly smaller thickness 54 of the middle layer 48 can result in less than the desired duration of contact with the granular activated charcoal. On the other hand, a smaller diameter 34, with a similar volume of granular activated charcoal, requires a greater pressure drop across the filter unit 13 to be provided by the user, and it would thus be more difficult to achieve a satisfactory flow rate through the filter. Additionally, the silver content acts in a well-known bacteriostatic manner against organisms which might be present in the water being filtered.

The porosity of the inlet end or lower layer 44 end and the outlet end or upper layer 50 of the filter is such that it permits passage of water therethrough under the forces provided normally by a person sucking on the mouthpiece, normally a pressure drop across the filter of about 5 inches of mercury or less, yet withstands the force of gravity acting on water which has been drawn through the three layers 44, 48, and 50 of filter material into the cavity 38, so that water will not flow backwards out of the portable personal filter 10. For example, the lower layer 44 and upper layer 50 may both be of porous material made of 100-micron-diameter polypropylene particles sintered to pass particles having a 5-10 micron particle size while blocking larger particles, referred to commonly as 8-micron filter material, each layer 44, 50 being thick enough to be self-supporting. As a result, filtered water remains within the cavity 38, where it is available to be drawn through the conduit 22 into a person's mouth immediately when desired, and a quantity of water remains within the middle layer 48, in contact with the activated charcoal filter medium, permitting continued adsorption of foreign material from the water during the time between when sips are actually being taken from the mouthpiece 20 by the user.

The positions of the inlet end and outlet end layers 44 and 50 of mechanical filter material are established by the retainer fittings 17 and 19, respectively, and by annular ledges 47 and 53 respectively defined in the tube wall of the body 14 and projecting radially inward about 0.010 inch.

When use of the personal portable filter device 10 has been completed at a particular time, any water remaining within the filter medium and the cavity 38 can be removed from the filter 10 by blowing back through the mouthpiece 22, forcing air into the filter housing 14 and through the layers of filter medium to drain the layers of filter material, so that water will not drip out of the personal water filter 10.

As shown in FIG. 4, the portable personal water filter 10 may conveniently be carried in a generally tubular carrying container 56 having a closed bottom end 58 and a removable cap 60 located at its upper end. The container 56 encloses the portable personal filter 10 sealingly to protect it from contamination, so it can be carried ready for use, as when traveling in areas where the drinking water quality is doubtful. The container 56 may be of any suitable material, such as a molded transparent plastic, for example.

Referring now also to FIGS. 5 and 6, a further embodiment of the invention is exemplified in a drinking water container such as a molded plastic bottle 70. The bottle 70 is of a convenient size and shape for being carried by a user while containing a suitable quantity of water to be drunk over a period of time by, for example, runners, bicyclists, or other athletes performing at levels of exertion which require regular replacement of body fluids lost through perspiration and respiration. For example, a generally cylindrical, molded, resiliently flexible plastic drinking water bottle having a capacity of one liter is commonly used by athletes, and is appropriate for the present invention. The bottle 70 has a mouth 72 which is large enough to permit the bottle to be filled easily with water and ice cubes, as desired. The mouth 72 is selectively closed by a cover 74 which is removable, as by the use of mating threads in the cover and about the neck of the bottle 70. The cover 74 defines a hole 76 through which a flexible drinking tube 78 extends into the bottle 70. The hole 76 fits the flexible tube 78 snugly enough to prevent the flexible tube 78 from sliding too freely, but permitting the flexible tube 78 to be adjusted in its position with respect to the cover 74, and allowing only gradual passage of air into the interior of the bottle 70 around the tube 78.

Inside the bottle 70 is a filter housing 71 which is substantially identical with the filter housing 14 of the portable personal water filter 10, and which contains a filter unit 13 whose components are designated herein by the same reference numerals used in describing the filter 10. The filter housing 71 is interconnected operatively with the lower end 81 of the flexible tube 78 by a reducing coupling 82, which fits over the upper or outlet end 18 of the filter housing 14 in a fashion similar to that in which the mouthpiece 20 fits atop the outlet end 18. Over a short distance 84, such as about ½ inch, the coupling 82 is tapered in diameter, from an inside diameter great enough to receive the outlet end 18 to a smaller inside diameter 86 substantially equal to the outside diameter of the flexible tube 78, that is, about 0.375 inch in one embodiment of the device. Preferably, a radial ledge 88 is provided in the smaller end of the reducing coupling 82 to limit the extent to which the flexible tube 78 is inserted into the reducing coupling 82, and, similarly, a radial ledge 90 is defined in the lower, larger diameter, end of the reducing coupling 82 to locate the coupling 82 properly with respect to the upper or outlet end 18 of the filter housing 14. The reducing coupling 82 may be molded, for example, of a polyurethane plastic material.

Preferably, the sizes of the mating portions of the reducing coupling 82, the flexible tube 78, and the upper o outlet end 18 of the filter housing 14 are interrelated to provide a push fit tight enough to maintain airtight interconnection of the parts ordinarily, yet allow them to be separated as desired, particularly for replacement of the filter unit 71 after it has been used long enough to reduce the efficiency of the filter media.

A removable cap 92 is preferably provided on the outer end of the flexible tube 78 as protection against contamination.

Preferably the bottle 70 is manufactured of a resiliently flexible molded plastic material which is unbreakable, and, to some extent, squeezable. By squeezing the bottle 70, it is possible to suck water through the tube 78 from within the bottle 70 at a rate greater than that which can be replaced easily by air passing into the bottle 70 around the tube 78 extending through the hole 76. Preferably, the tube 78 fits tightly enough in the hole 76 so that water can be forced through the filter unit 71 and the drinking tube 78 by manually squeezing the bottle 70 with a moderate force, without losing significant quantities of water through the hole 76. At the same time, the interior diameter of the conduit for filtered water defined by the flexible tube 78 is small enough, for example, about 0.235 inch or less, to limit the flow of water through the filter unit 71 to some extent, so that ample contact time is provided for purification of water by the charcoal filter medium of the middle layer 48 contained therein. Particularly in this embodiment of the invention, moreover, the normal pattern of use by an athlete, of occasionally sipping some water from the flexible tube 78, or squeezing the bottle 70 to squirt a small amount of water into his or her mouth, results in water remaining in contact with the charcoal filter medium for a long enough time for effective purification of the water consumed.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A portable personal water filter, comprising:
   (a) an elongate tubular filter housing having an upper end and a lower end;
   (b) a multi-layer filter contained within said housing, at least one layer of said filter consisting substantially of granular activated charcoal;
   (c) upper and lower layers of water-permeable material respectively located in said filter housing above and below said one layer for retaining said one layer within said housing, at least one of said upper and lower layers being sufficiently resistant to flow of water to retain within said multi-layer filter, against the force of gravity, substantially all of a quantity of water drawn into said multi-layer filter until said quantity of water is expelled by introduction of reverse pressure within said filter housing; and
   (d) a tapered mouthpiece surrounding said upper end of said tubular housing and defining a conduit communicating with the interior of said filter housing for conducting filtered water to a user's mouth, said mouthpiece having an upper end of a comfortable size and shape to be received in a user's mouth.

2. The portable personal water filter of claim 1 wherein said filter housing and said mouthpiece define a cavity above said multi-layer filter for containing a quantity of filtered water ready to be withdrawn through said upper end of said mouthpiece.

3. The portable personal water filter of claim 1 wherein said layer of granular activated charcoal extends over a majority of the length of said filter housing.

4. The portable personal water filter of claim 1 wherein said conduit defined in said mouthpiece is sufficiently smaller than the interior of said filter housing to limit the flow of water through said mouthpiece to a rate which results in flow of water through said filter at a rate at which the filter is effective in adsorbing impurities from said water as it passes through said filter.

5. The portable water filter of claim 1 wherein said upper end of said mouthpiece has a lozenge shape as seen in end view.

6. The portable water filter of claim 1 wherein said upper end of said mouthpiece has a lenticular shape as seen in end view.

7. The personal water filter of claim 1 wherein said upper and lower layers of water-permeable material are particle filters permitting passage of particles smaller than a predetermined size while substantially preventing passage of particles greater than said predetermined size.

8. The portable personal water filter of claim 1 including a respective retainer fitting holding said lower layer in place proximate said lower end of said filter housing.

9. A drinking water filtration kit for personal use, comprising:
   (a) a personal filter device including an elongate tubular filter housing having an upper end and a lower end;
   (b) a multi-layer filter contained within said housing, at lest one layer of said filter consisting substantially of granular activated charcoal;
   (c) means including upper and lower layers of water permeable material respectively located in said filter housing above and below said one layer for retaining said one layer within said housing, at least one of said upper and lower layers being sufficiently resistant to flow of water to retain within said multi-layer filter, against the force of gravity, substantially all of a quantity of water drawn into said multi-layer filter until said quantity of water is expelled by introduction of reverse pressure within said filter housing;
   (d) a tapered mouthpiece surrounding said upper end of said tubular housing and defining a conduit communicating with the interior of said filter housing for conducting filtered water to a user's mouth, said mouthpiece having an upper end of a comfortable size and shape to be received in a user's mouth; and
   (e) said personal filter device being protectively contained in a tubular container having a pair of ends including a substantially sealing removable cap covering one of said ends.

10. A combined personal drinking water container and filter, comprising:
    (a) a bottle for containing a quantity of water;
    (b) means defining an opening into the interior of said bottle;
    (c) a drinking tube having a mouthpiece end and a lower end, said drinking tube extending through said opening and said lower end being located within said bottle;
    (d) an elongate filter housing located within said bottle, said filter housing being generally tubular and having an outlet end and an inlet end exposed within said bottle;
    (e) coupling means for interconnecting said outlet end of said filter housing with said lower end of said drinking tube within said bottle; and
    (f) a filter contained within said filter housing, said filter being of a multi-layer construction including upper and lower particle filter layers respectively located proximate said inlet and outlet ends of said tubular filter housing and including a layer of granular activated charcoal filter medium located between said inlet and outlet particle filter layers, at least one of said upper and lower layers being sufficiently resistant to flow of water to retain within said multi-layer filter, against the force of gravity, substantially all of a quantity of water drawn into said multi-layer filter until said quantity of water is expelled by introduction of reverse pressure within said filter housing.

11. The device of claim 10, said filter housing being tubular and of a larger diameter than said drinking tube and said coupling being a size-reducing coupling.

12. The device of claim 10 wherein said layer of charcoal filter medium extends over the majority of the length of said filter housing.

13. The device of claim 10 wherein said bottle defines a mouth and including selectively removable cover means for closing said mouth, said opening being defined by said cover means.

14. The device of claim 10 wherein said filter housing is about 6 inches long and has a diameter of about 0.55 inch.

15. The device of claim 10 wherein said bottle is of resiliently flexible plastic and said opening fits tightly enough around said drinking tube that water can be forced through said filter and said drinking tube by squeezing said bottle manually.

* * * * *

UNITED STATES PATENT AND TRADEMARK OFFICE
CERTIFICATE OF CORRECTION

PATENT NO. : 5,045,195

DATED : September 3, 1991

INVENTOR(S) : Bruce D. Spangrud et al.

It is certified that error appears in the above-identified patent and that said Letters Patent is hereby corrected as shown below:

TITLE PAGE

In the Abstract: Line 3  Insert after "filtration" --material adjacent inlet and outlet ends of the housing--.

Col. 1, line 59   Change "o" to --or--.

Col. 6, line 47   Change "o" to --or--.

Col. 8, line 15   Change "lest" to --least--.

Signed and Sealed this

Twenty-third Day of February, 1993

Attest:

STEPHEN G. KUNIN

*Attesting Officer*       *Acting Commissioner of Patents and Trademarks*